United States Patent

Mah

[11] Patent Number: 5,413,017
[45] Date of Patent: May 9, 1995

[54] COUNTER-ROTATING KNIFE PAPER TAIL RIPPER

[75] Inventor: Stanley H. Mah, Burnaby, Canada

[73] Assignee: Fibron Machine Corp., British Columbia, Canada

[21] Appl. No.: 39,456

[22] PCT Filed: Oct. 11, 1991

[86] PCT No.: PCT/CA91/00369
§ 371 Date: Jun. 21, 1993
§ 102(e) Date: Jun. 21, 1993

[87] PCT Pub. No.: WO92/08005
PCT Pub. Date: May 14, 1992

[30] Foreign Application Priority Data

Oct. 24, 1990 [CA] Canada .................. 2028443

[51] Int. Cl.$^6$ .................. D21G 9/00; B26D 1/29
[52] U.S. Cl. .................. 83/152; 83/491; 83/564; 83/676; 83/733
[58] Field of Search ............. 162/193, 194, 286; 242/56.6; 83/100, 105, 402, 408, 410.8, 491, 500, 564, 676, 152, 733; 225/93, 97, 98, 103; 241/236

[56] References Cited

U.S. PATENT DOCUMENTS

| | | | |
|---|---|---|---|
| 2,770,302 | 11/1956 | Lee | 83/500 X |
| 3,125,139 | 3/1964 | Weinzierl | 83/676 X |
| 3,143,016 | 8/1964 | Obenshain | 83/402 X |
| 3,355,349 | 11/1967 | Devlin | 162/286 |
| 3,625,813 | 12/1971 | Eckleman | 162/286 |
| 3,805,652 | 4/1974 | LaLonde et al. | 83/564 X |
| 4,195,539 | 4/1980 | Coburn | 83/408 X |
| 4,257,565 | 3/1981 | Hatanaka | 83/500 X |
| 4,506,577 | 3/1985 | Shinomiya et al. | 83/564 X |
| 4,566,944 | 1/1986 | Mauranen et al. | 162/286 |
| 4,671,151 | 6/1987 | Rooney | 83/150 |
| 4,818,343 | 4/1989 | Laine | 162/286 |
| 4,904,344 | 2/1990 | Peiffer | 162/193 |
| 4,923,567 | 5/1990 | Liedes et al. | 162/193 |
| 4,945,655 | 8/1990 | Wedel | 34/23 |

FOREIGN PATENT DOCUMENTS

| | | | |
|---|---|---|---|
| 1067846 | 5/1967 | United Kingdom. | |
| 0798209 | 1/1981 | U.S.S.R. | 83/491 |

Primary Examiner—Eugenia Jones
Attorney, Agent, or Firm—Oyen Wiggs Green & Mutala

[57] ABSTRACT

A paper tail ripper having a pair of rotatably mounted knives, air motors which counter-rotate the knives and a deflector which deflects the paper tail toward the knives. The knives traverse closely spaced overlapping circles as they counter-rotate. The deflector sweeps the paper tail onto a transfer mechanism, which transfers the paper tail away from the ripper, so that the tail may be threaded through a calender stack, etc. The ripper is pivotally mounted on the transfer mechanism for movement between storage and operating positions.

20 Claims, 6 Drawing Sheets

COUNTER-ROTATING KNIFE PAPER TAIL RIPPER

FIELD OF THE INVENTION

This application pertains to apparatus for severing a rapidly moving paper tail so that the severed tail may be transferred to a selected part of a paper making machine, such as a calender stack threader.

BACKGROUND OF THE INVENTION

At various stages of the operation of a typical paper making machine a rapidly moving, continuous sheet of paper must be threaded through different parts of the machine as the paper is made. For example, one such stage occurs when the moving, continuous sheet of paper passes at high speed over a plurality of dryer rolls and then through a stack of calender rolls which calender the paper by imparting a finish of desired smoothness thereto. Since it is difficult to guide the full width of the moving paper sheet off the last dryer roll and then feed it through the calender stack, a narrow "tail" is cut to one side of the moving sheet as it comes off the last dryer roll, the balance of the moving sheet being allowed to fall into a broke pit for reprocessing. The tail (which moves at the same speed as the paper sheet from which it is cut) is more easily fed through the calender stack and, once threaded, can be used to draw the full width of the paper sheet through the calender stack.

Those skilled in the art will readily appreciate that similar threading operations are encountered at other stages in the "dry end" operation of a typical paper making machine. These may for example involve passage of the moving paper sheet onto reel systems, slitters, winders, rewinders, or other parts of the paper making machine, as will be familiar to those skilled in the art. The present application focuses upon the calender stack threading operation by way of example only. It is to be understood that the invention hereinafter disclosed may be applied to any tail threading operation encountered at the wet or dry end of a paper making machine.

Once the tail has been cut, it must be transferred to a selected part of the paper making machine. This requires that the tail be ripped or severed transversely to the direction in which it is moving, to produce an end which can be threaded through a calender stack, etc.

Various prior art techniques have been used to sever moving paper tails. U.S. Pat. No. 4,671,151 issued 9 Jun., 1987 for an invention of Sidney C. Rooney entitled "Paper Tail Cutter" discloses a cutter body member which is pivotally mounted to swing a V-shaped knife through a moving paper tail as the tail falls into a broke pit. The tail is severed in a scissor-like cutting action as the swinging knife passes a mating stationary knife. The pivoting body member supports the severed end of the tail and deflects it to a calender threader, etc. A disadvantage of such apparatus is that the body member and its associated drive mechanism are comparatively bulky, which may frustrate installation of the apparatus in cramped quarters.

U.S. Pat. No. 4,818,343 issued 4 Apr., 1989 for an invention of Paavo Laine entitled "Device For Cutting Off An Edge Strip And For Guiding The Edge Strip In Connection With The Threading Of a Paper or Board Web" discloses a pivotally mounted body member. A pair of knives are pivotally mounted on opposite sides of the body member. The knife blades normally extend parallel to and face one another. When the moving paper tail is to be severed, the body member is pivoted to position the knives on either side of the moving tail. The knives are then pivoted inwardly, such that their blades pass through the tail, severing it. The moving knives (possibly assisted by air jets) carry the severed tail end onto the body member, which directs it to a calender threader, etc. This apparatus and its associated drive mechanism is also comparatively bulky, which presents the disadvantage aforesaid. Moreover, problems may arise if the knives, fail to completely sever the tail during their single pivotal pass through the path of the moving tail.

U.S. Pat. No. 4,904,344 issued 27 Feb., 1990 for an invention of Robert E. Peiffer entitled "Automatic Web Threading Apparatus and Method" discloses a stationary serrated knife with associated means for drawing the moving paper tail across the knife to sever the tail, and for guiding the severed tail end to a calender threader, etc. Mechanical knives of this sort are quickly dulled and thus lose their ability to reliably cut the paper tail. This is particularly so if the knife is used to cut tough, hard stock such as a moving pulp sheet, which can be about ⅛" thick.

The present invention provides a compact device having a pair of counter-rotating knives which reliably sever the tail as it is drawn across the rotating knives.

SUMMARY OF THE INVENTION

In accordance with the preferred embodiment, the invention provides a paper tail ripper, comprising first and second rotatably mounted knives; drive means for counter-rotating the knives; and, deflector means for deflecting the paper tail toward the knives. The knives may respectively comprise multiple circumferentially spaced cutting edges which project, in their respective directions of counter-rotation, approximately tangentially to the circles traversed by the counter-rotating knives. The knives may advantageously be mounted to counter-rotate in closely spaced, overlapping circles. The drive means may comprise first and second air motors respectively drivingly coupled to the first and second knives.

A transfer means such as a vacuum conveyor may be provided for transferring the paper tail away from the paper tail ripper. Advantageously, the paper tail ripper is pivotally mounted on the transfer means for movement between storage and operating positions.

The deflector means is preferably a deflector plate which sweeps the paper tail toward the ripper, carrying the tail through the counter-rotating knives, and ensuring that the tail is severed. A pivotal mounting means is provided for pivotally mounting the deflector plate for movement between storage and operating positions. An air jet bathes the deflector plate with an air curtain which draws the rapidly moving paper tail toward the surface of the deflector plate, thus controlling the position of the paper tail as it is presented to the counter-rotating knives. The deflector plate has a curved lip which lifts the severed end of the paper tail over the knives and presents it to the vacuum conveyor.

DETAILED DESCRIPTION OF THE PREFERRED EMBODIMENT

Figure 1:
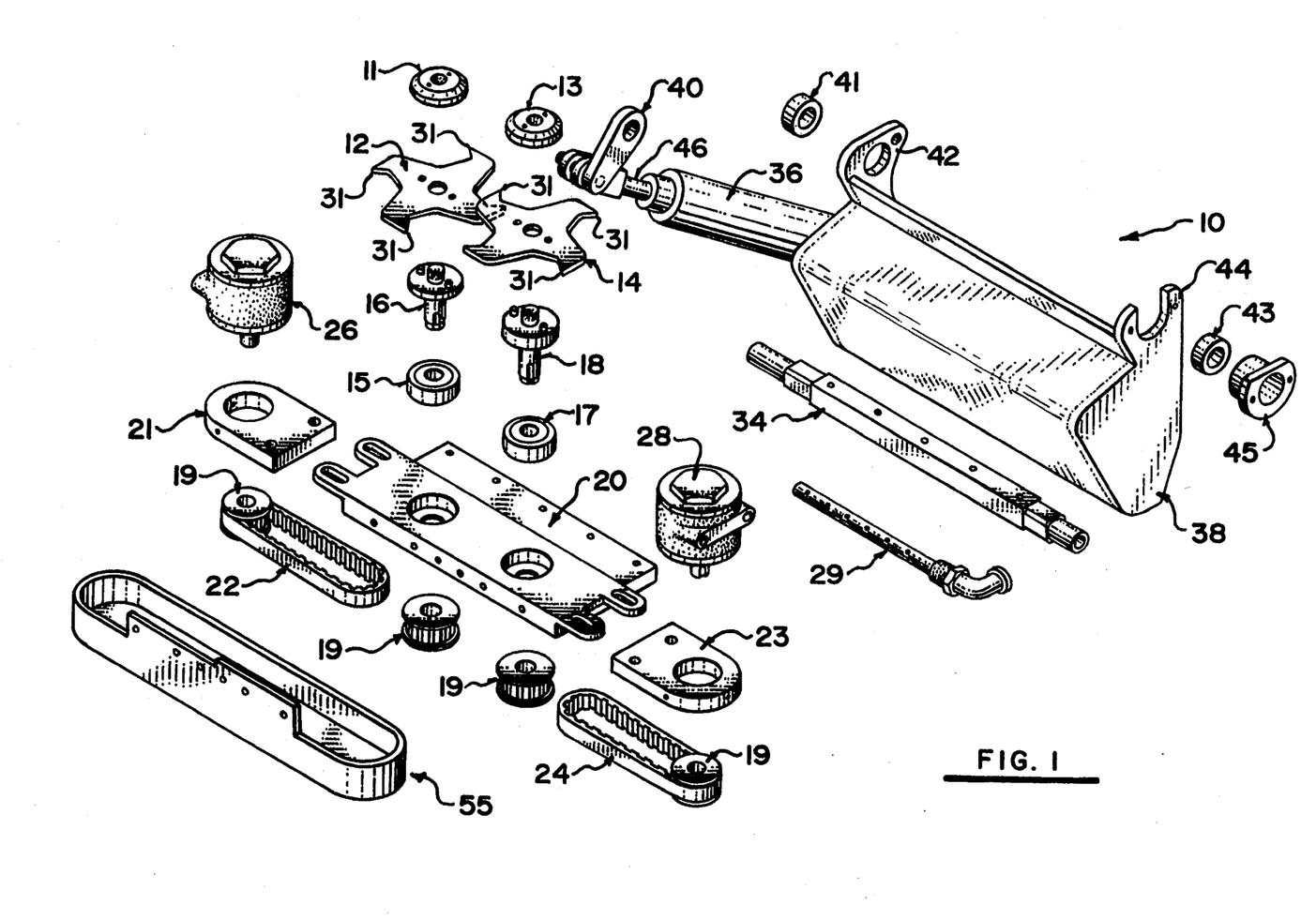
FIG. 1 is an exploded assembly drawing of a counter-rotating knife paper tail ripper constructed in accordance with the preferred embodiment of the invention.
Figure 2:
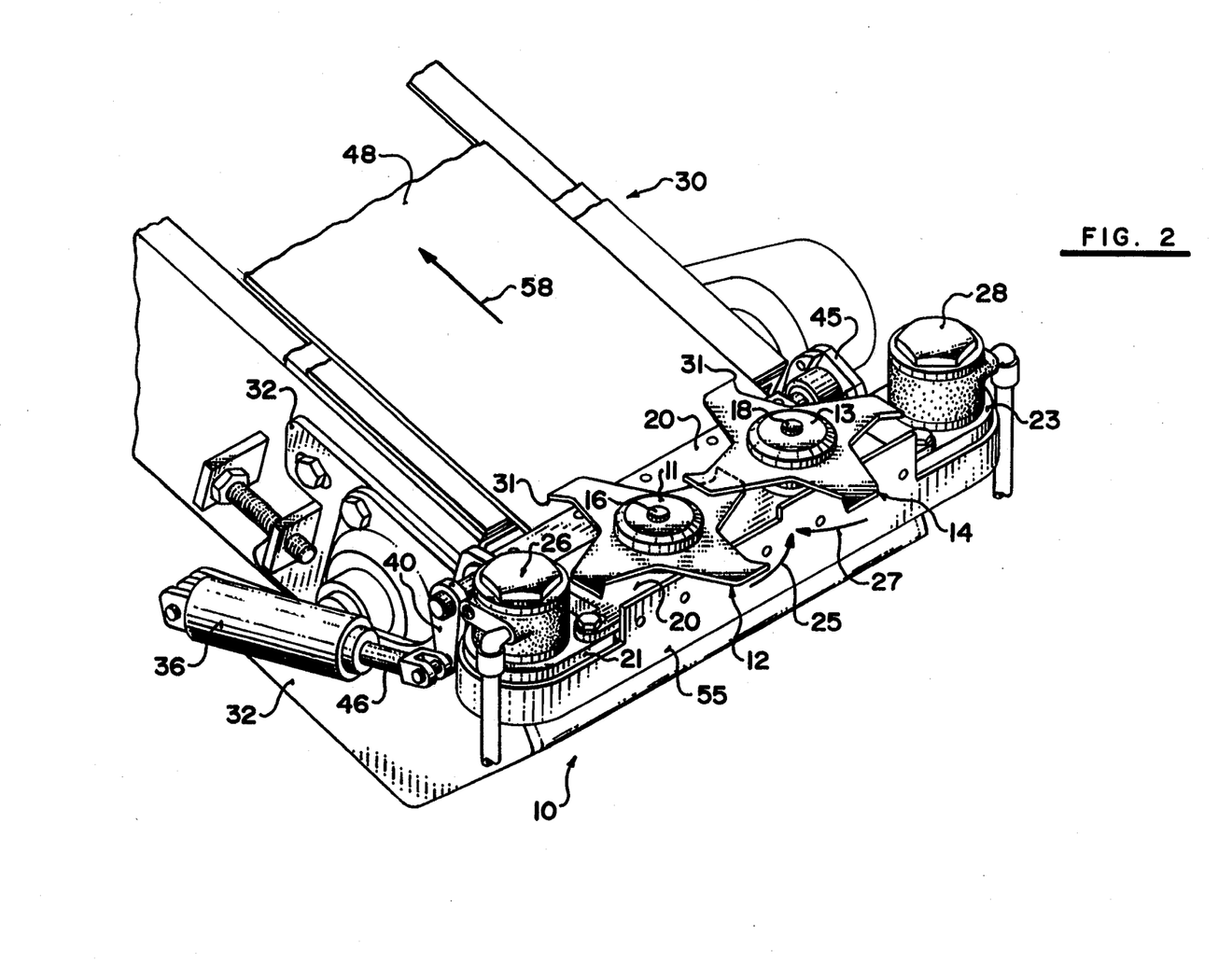
FIG. 2 is a simplified oblique top front perspective illustration of the preferred embodiment, mounted on a vacuum transfer conveyor and pivoted into the operating position.
Figure 3:
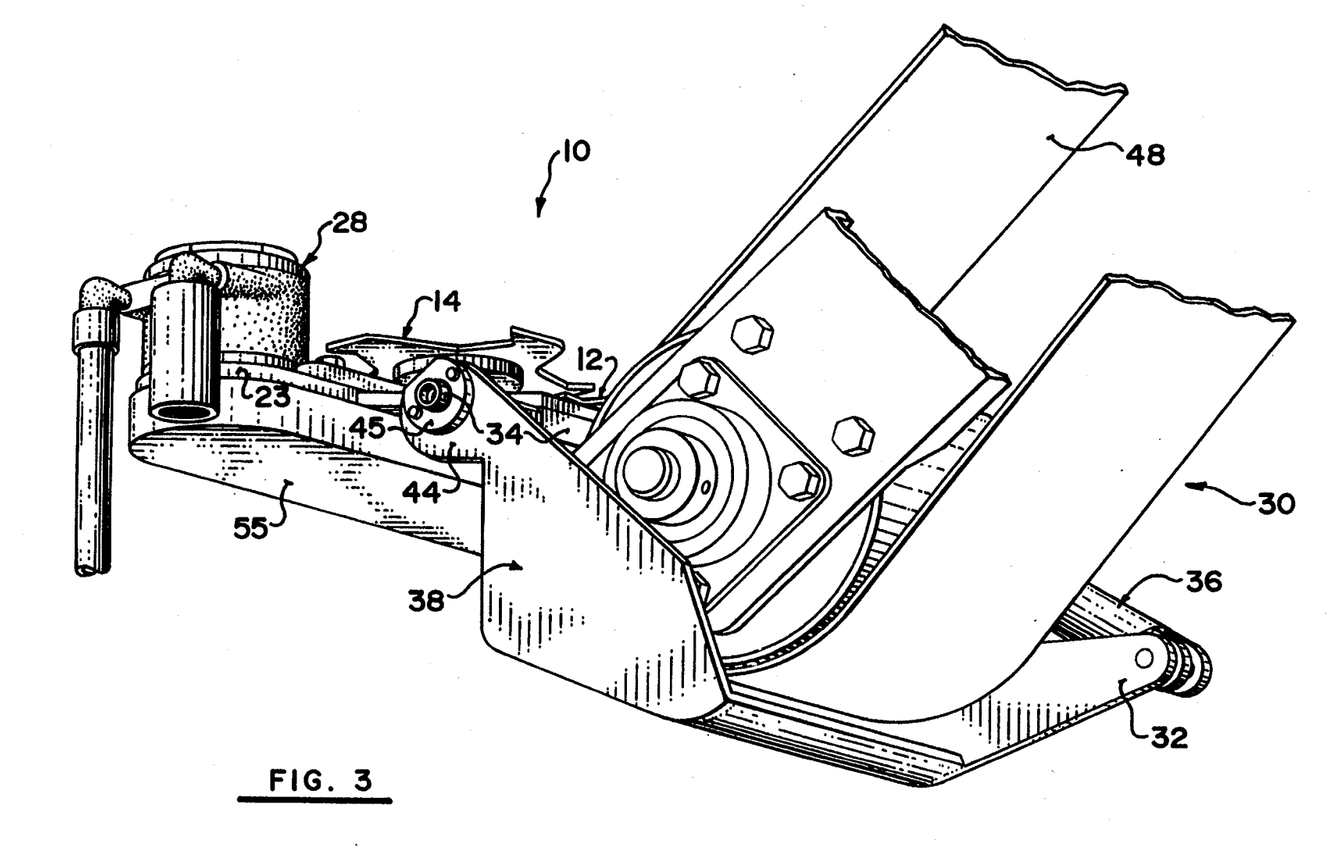
FIG. 3 is an oblique bottom rear perspective illustration of the apparatus depicted in FIG. 2. Portions of the vacuum transfer conveyor have been eliminated from FIG. 3 to avoid obscuring details of the invention.

FIGS. 1, 2 and 3 depict a paper tail ripper 10, comprising first and second knives 12, 14. Each knife fits over the top end of a separate shaft 16, 18. Nuts 11, 13 secure knives 12, 14 to the tops of shafts 16,.18. Bearings 15, 17 ride between bearing plate 20 and the tops of shafts 16, 18. The bottom ends of shafts 16, 18 project through bearing plate 20 and are respectively drivingly coupled by pulleys 19 and drive belts 22, 24 to a "drive means", namely compressed air powered motors 26, 28. Air motors 26, 28 are mounted on support plates 21, 23 which are in turn adjustably fastened to opposed ends of bearing plate 20. High speed electric motors could be used instead of air motors 26, 28. Protective shroud 55 encloses pulleys 19 and drive belts 22, 24. A protective guard (not shown) may be provided over knives 12, 14 to minimize possible injury to personnel working in the vicinity of paper tail ripper 10.

Air motors 26, 28 are actuated as hereinafter explained to counter-rotate knives 12, 14 at high speed (typically 6,000 to 7,000 rpm) in the direction of arrows 25, 27 (FIG. 2) to sever paper tail 100. Shafts 16, 18 are desirably (although not essentially) constructed and positioned such that knives 12, 14 traverse overlapping circles and lie in closely spaced, parallel planes as they counter-rotate. Knives 12, 14 have multiple ground edge or carbide-tipped cutting edges 31 circumferentially spaced around the knives' outer rims. As depicted in the drawings, cutting edges 31 project, in their respective directions of counter-rotation, approximately tangentially to the circles traversed by the counter-rotating knives. Air jet 29 is actuated as knives 12, 14 counter-rotate to prevent debris generated by the cutting action from accumulating in ripper 10.

Paper tail ripper 10 may be used in conjunction with a "transfer" means such as a vacuum conveyor 30 of the type described in Canadian Patent No. 1,044,719 issued 19 Dec., 1978 for an invention of Sidney C. Rooney entitled "Sheet Handling Apparatus". Vacuum conveyor 30 transfers paper tail 100 away from paper tail ripper 10 for further processing, such as threading through a calender stack (not shown).

A "pivotal mounting means" comprising bracket 32, pivot shaft 34 and air cylinder 36 (FIG. 2) is provided for pivotally mounting paper tail ripper 10 at the end of vacuum conveyor 30. More particularly, bracket 32 is fixed to and protrudes from one side of support structure 38. Bracket 32 is fastened to one side of vacuum conveyor 30. The cylinder end of air cylinder 36 is pivotally connected to bracket 32; and, the rod end is pivotally connected to one end of crank arm 40. The opposite end of crank arm 40 is fixed to one end of pivot shaft 34. The opposed ends of pivot shaft 34 are rotatably supported by bearings 41, 43 and bushing 45 which are in turn supported by plates 42, 44 of support structure 38. Cylinder rod 46 is normally retracted within cylinder 36. An operator may however manually actuate a compressed air supply (not shown) coupled to cylinder 36, to extend rod 46 from cylinder 36. As rod 46 extends it pivots crank arm 40 about pivot shaft 34, thereby rotating pivot shaft 34 between plates 42, 44. Bearing plate 20 is fastened to pivot shaft 34. Accordingly, rotation of pivot shaft 34 rotates bearing plate 20 approximately 90° about the longitudinal axis of pivot shaft 34, thus moving paper tail ripper 10 from a storage position (FIG. 5C) into an operating position (FIGS. 2, 5A and 5B) in which knives 12, 14 counter-rotate adjacent the end of the perforated, moving belt 48 of vacuum conveyor 30.

Vacuum conveyor 30 is also pivotally mounted so that it too may be moved, in conventional fashion, between storage and operating positions.

Figure 4A:
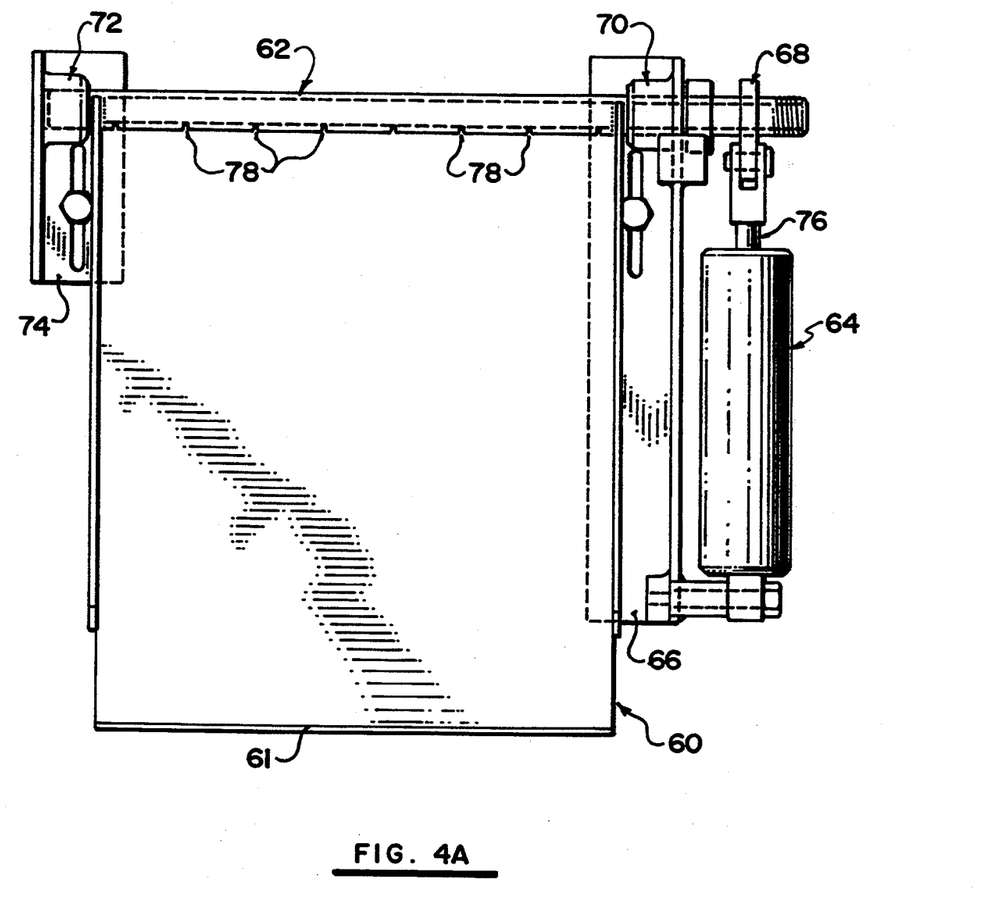
FIG. 4A is a front plan view of a deflector plate for deflecting a moving paper tail toward the paper tail ripper.
Figure 4B:
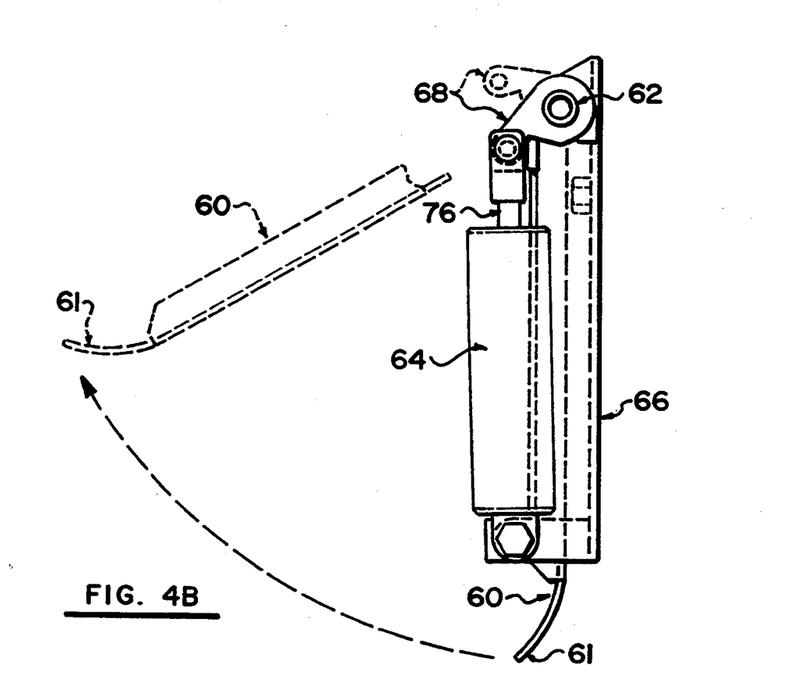
FIG. 4B is a right side view of the deflector plate of FIG. 4A.

FIGS. 4A and 4B illustrate a deflector plate 60 for deflecting the paper tail toward paper tail ripper 10. Deflector plate 60 controls the presentation of the moving paper tail to ripper 10, resulting in more reliable operation of ripper 10 with certain weights and grades of paper. Plate 60 is fixed on pivot shaft 62. The cylinder end of air cylinder 64 is pivotally connected to inner mounting bracket 66; and, the rod end 76 is pivotally connected to one end of crank arm 68. The opposite end of crank arm 68 is fixed to one end of pivot shaft 62. The opposed ends of pivot shaft 62 are rotatably supported by bushings 70, 72 which are in turn fixed to inner and outer mounting brackets 66, 74 respectively.

Figure 5A:
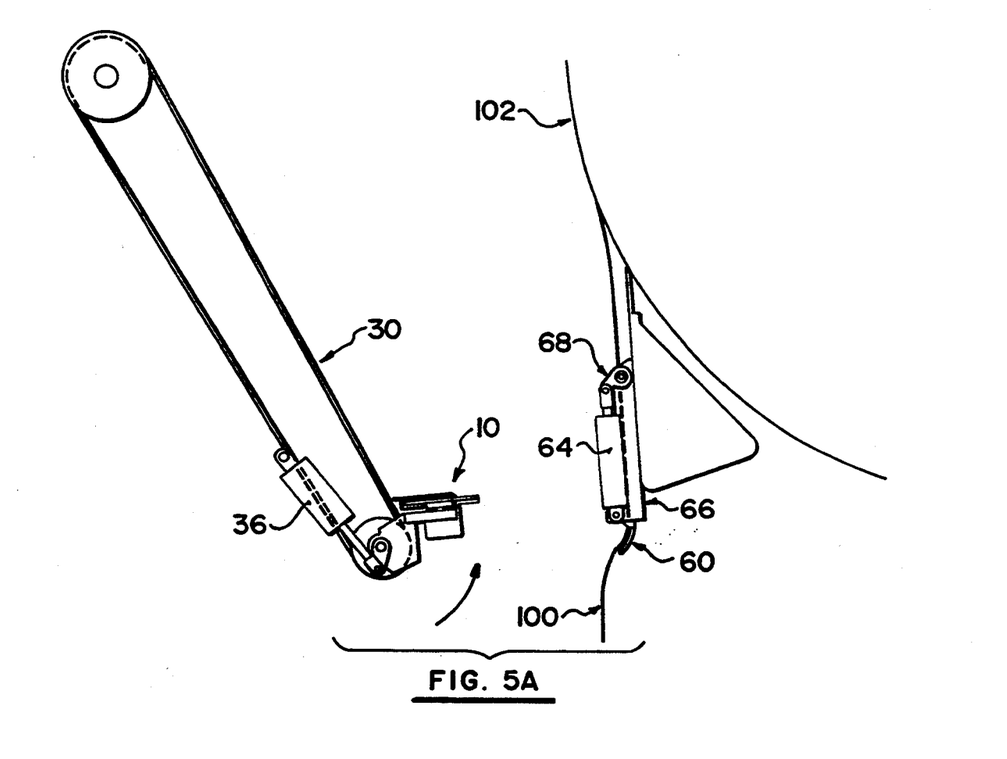
FIG. 5A is a simplified, diagrammatic side elevation view of the preferred embodiment, shown in its operating position, with the paper tail falling off a dryer roll, over a deflector plate and into a broke pit.
Figure 5B:
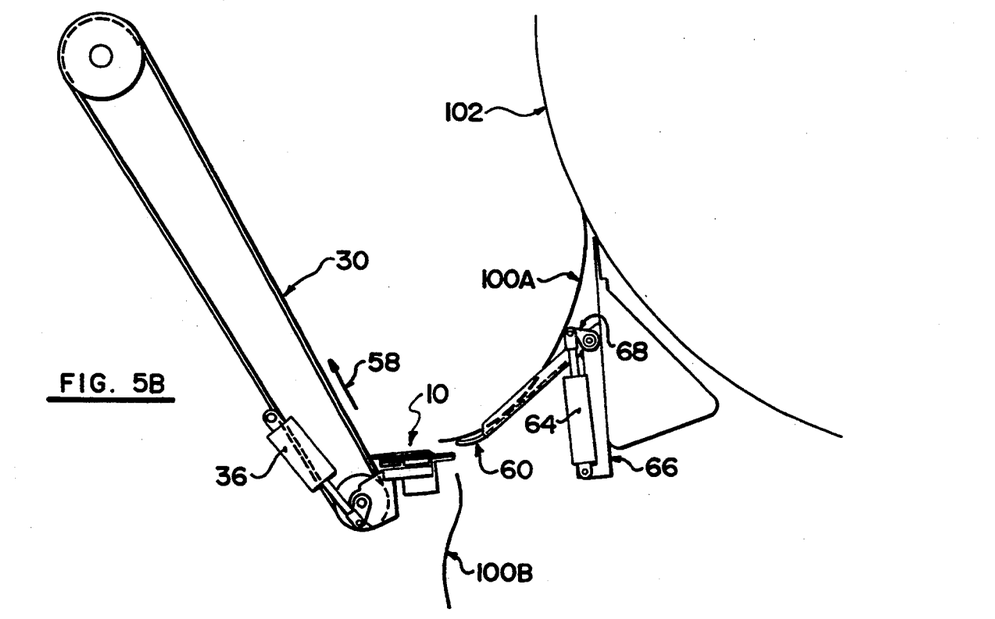
FIG. 5B is a simplified, diagrammatic side elevation view of the preferred embodiment, shown in its operating position, with the deflector plate operative to deflect the paper tail into the paper tail ripper.

Cylinder rod 76 is normally retracted within cylinder 64. An operator may however manually actuate a compressed air supply (not shown) coupled to cylinder 64, to extend rod 76 from cylinder 64. As rod 76 extends, it pivots crank arm 68 about pivot shaft 62, thereby rotating pivot shaft 62 between brackets 66, 74. Cylinder 64 is adjusted so that maximum extension of rod 76 causes pivot shaft 62 to rotate approximately 60° about its longitudinal axis, thus moving reflector plate 60 from a storage position (FIG. 5C) into an operating position (FIGS. 5A and 5B). The extent of rotational pivoting of shaft 62 may vary, depending upon the length of deflector plate 60, which in turn depends upon the width of the broke pit.

Pivot shaft 62 is hollow. A series of small apertures 78 are provided in shaft 62. Apertures 78 extend at spaced intervals across shaft 62, immediately above the plane of intersection between deflector plate 60 and shaft 62. When cylinder 64 is actuated as aforesaid, compressed air is blown into shaft 62, which distributes the air through apertures 78, bathing the surface of deflector plate 60 with a moving air curtain. The lower end 61 of deflector plate 60 is curved.

Figure 5C:
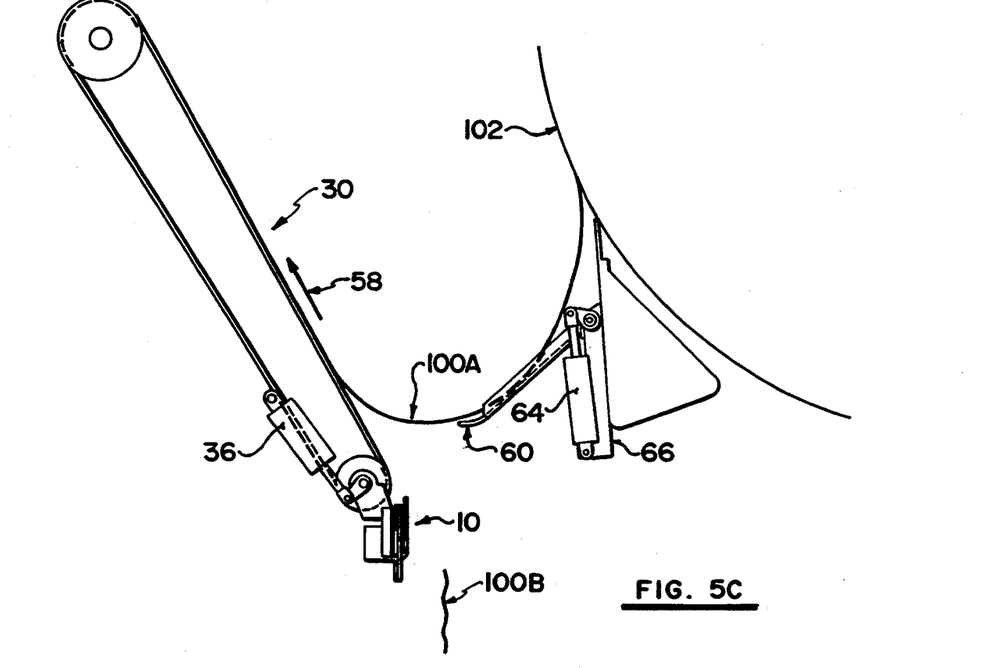
FIG. 5C is a simplified, diagrammatic side elevation view of the preferred embodiment, shown in its storage position, after severance of the tail, with the severed end of the tail being drawn along the vacuum conveyor for further processing.

In operation, the deflector plate assembly depicted in FIGS. 4A and 4B is mounted beneath the forward end of dryer roll 102, as shown in FIGS. 5A through 5C. Paper tail ripper 10 and associated vacuum conveyor 30 are mounted in front of the deflector plate assembly. An operator actuates a mechanism (not shown) to pivot vacuum conveyor 30 from a storage position into the operating position shown in FIGS. 5A through 5C. Paper tail ripper 10 is initially in its storage position shown in FIG. 5C. The operator actuates air cylinder 36 as aforesaid to pivot paper tail ripper 10 into its operating position shown in FIGS. 5A and 5B. Throughout the foregoing operations, paper tail 100 falls off dryer roll 102, over deflector plate 60 (i.e. past paper tail ripper 10) into a broke pit.

When paper tail ripper 10 is in the operating position shown in FIGS. 5A and 5B, knives 12, 14 are preferably horizontal or inclined upwardly at an angle of no more than about 15° above the horizontal. Inclination of knives 12, 14 outside this range may cause the severed tail to become jammed within knives 12, 14.

The operator next actuates a compressed air supply to deliver compressed air to air motors 26, 28 causing them to counter-rotate. Finally, the operator actuates air cylinder 64 as aforesaid, thereby pivoting deflector plate 60 from its storage position (FIG. 5A) into its operating position (FIGS. 5B and 5C). As it pivots, deflector plate 60 sweeps paper tail 100 toward paper tail ripper 10, and continues to carry paper tail 100 through counter-rotating knives 12, 14 thus ensuring that paper tail 100 is severed. It can thus be seen that pivot shaft 62 and cylinder 64 together comprise a "pivotal mounting means" for pivotally mounting deflector plate 60 for movement between its storage and operating positions.

The pivotal movement of deflector plate 60 relative to paper tail ripper 10 should be fast enough to carry the severed end of the paper tail away from ripper 10. Otherwise, the severed paper tail may become jammed within knives 12, 14. The required speed of pivotal movement will vary, depending upon the speed at which paper tail 100 moves off dryer roll 102.

In the case of lighter weight paper stocks, the gap between knives 12, 14 and the end of the pivoted deflector plate should be small enough to prevent the severed end of the paper tail from drooping within the gap and becoming jammed within knives 12, 14.

The air curtain provided by apertures 78 tends to draw rapidly moving paper tail 100 toward the surface of deflector plate 60. This allows paper tail 100 to glide smoothly over the surface of deflector plate 60, while controlling the position of paper tail 100 as it is presented to paper tail ripper 10 for severing. Care should be taken to ensure that the air curtain is not so strong that paper tail 100 buckles or that the progress of paper tail 100 over deflector plate 60 is otherwise impeded.

As paper tail 100 comes in contact with perforated moving belt 48 of vacuum conveyor 30, vacuum forces applied through belt 48 draw tail 100 firmly against moving belt 48, which carries tail 100 rapidly in the direction of arrow 58, looping tail 100 over itself. Preferably, belt 48 moves faster than tail 100. Accordingly, the portion of tail 100 which has fallen past ripper 10 toward the broke pit is drawn backwards towards ripper 10. This action carries tail 100 through counter-rotating knives 12, 14 to sever the tail. The cutting action of dual counter-rotating knives 12, 14 is balanced with respect to the tail, such that the severed section 100A of the tail is cast directly onto the central area of vacuum conveyor 30, rather than being flung to one side or the other.

Once the tail has been severed, air motors 26, 28 are deactivated and cylinder 36 is actuated to retract rod 46, thus returning ripper 10 to its storage position (FIG. 5C) so that it does not interfere with the severed tail as it is carried along vacuum conveyor 30.

As shown in FIG. 5C, one section 100A of the severed tail is drawn along vacuum conveyor 30, while the other section 100B falls into the broke pit. Curved lip 61 lifts severed end 100A over knives 12, 14 and presents it to vacuum conveyor 30. If belt 48 is driven faster than tail 100, any underlying looped portion of a lighter weight tail section on conveyor 30 is carried along the belt faster than the overlying portion, gradually eliminating the loop to leave the lighter weight tail section lying flat on belt 48 for delivery to a calender threader, etc.

As will be apparent to those skilled in the art in the light of the foregoing disclosure, many alterations and modifications are possible in the practice of this invention without departing from the spirit or scope thereof. For example, instead of comprising two air motors 26, 28 the drive means could alternatively comprise a single drive motor coupled to knives 12, 14 by one double-sided drive belt (i.e. a drive belt having drive teeth on both sides of the belt). The belt is looped around the drive motor's drive spindle and around one of pulleys 19, so that the belt's inner teeth drive that pulley and the knife coupled thereto in the same direction of rotation as the drive motor's drive spindle. The other one of pulleys 19 is positioned against the belt's outer teeth, to drive the other pulley and the knife coupled thereto in the direction opposite to the direction of rotation of the drive motor's drive spindle. Although presented herein as a paper tail ripper, those skilled in the art will appreciate that the invention is not restricted to use with paper, but may be adapted to controllably sever other rapidly moving strips of material. Accordingly, the scope of the invention is to be construed in accordance with the substance defined by the following claims.

What is claimed is:

1. A paper tail ripper for transversely severing a moving paper tail, said ripper comprising:
   (a) a first knife having a first center of rotation;
   (b) a second knife having a second center of rotation;
   (c) drive means for counter-rotating said knives about said respective centers of rotation, while maintaining an axis intersecting said centers of rotation generally parallel to said moving paper tail; and,
   (d) deflector means for deflecting said paper tail toward said knives.

2. A paper tail ripper as defined in claim 1, wherein said knives respectively comprise multiple circumferentially spaced cutting edges.

3. A paper tail ripper as defined in claim 2, wherein said cutting edges project, in their respective directions of counter-rotation, approximately tangentially to circles traversed by said counter-rotating knives.

4. A paper tail ripper as defined in claim 2, wherein said knives are mounted to traverse overlapping circles during counter-rotation thereof.

5. A paper tail ripper as defined in claim 4, wherein said knives are mounted in closely spaced planes.

6. A paper tail ripper as defined in claim 2, wherein said drive means comprises first and second air motors respectively drivingly coupled to said first and second knives.

7. A paper tail ripper as defined in claim 2, wherein said deflector means comprises a deflector plate for deflecting said tail toward said knives.

8. A paper tail ripper as defined in claim 7, further comprising pivotal mounting means for pivotally mounting said deflector plate for movement of said deflector plate between storage and operating positions.

9. A paper tail ripper as defined in claim 8, further comprising an air jet for producing an air curtain across said deflector plate.

10. A paper tail ripper as defined in claim 9, further comprising a curved lip on said deflector plate for disrupting said air curtain at an end of said deflector plate.

11. A paper tail ripper as defined in claim 2, in combination with transfer means for transferring said paper tail away from said paper tail ripper.

12. A paper tail ripper as defined in claim 11, wherein said transfer means comprises a vacuum conveyor.

13. A paper tail ripper as defined in claim 2, in combination with transfer means for transferring said paper tail away from said paper tail ripper, and wherein said deflector means comprises a deflector plate for deflecting said tail toward said knives.

14. A paper tail ripper as defined in claim 13, in combination with pivotal mounting means for pivotally mounting said paper tail ripper on said transfer means for movement of said paper tail ripper between storage and operating positions.

15. A paper tail ripper for transversely severing a moving paper tail, said ripper comprising:
  (a) a first knife having a first center of rotation;
  (b) a second knife having a second center of rotation;
  (c) drive means for counter-rotating said knives about said respective centers of rotation, while maintaining an axis intersecting said centers of rotation generally parallel to said moving paper tail; in combination with:
    (i) transfer means for transferring said paper tail away from said paper tail ripper; and,
    (ii) deflector means for deflecting said paper tail toward said knives and said transfer means.

16. A paper tail ripper as defined in claim 15, further comprising pivotal mounting means for pivotally mounting said paper tail ripper on said transfer means for movement of said paper tail ripper between storage and operating positions.

17. A paper tail ripper as defined in claim 15, wherein said knives respectively comprise multiple circumferentially spaced cutting edges.

18. A paper tail ripper as defined in claim 17, wherein said cutting edges project, in their respective directions of counter-rotation, approximately tangentially to circles traversed by said counter-rotating knives.

19. A paper tail ripper as defined in claim 17, wherein said knives are mounted to traverse overlapping circles during counter-rotation thereof.

20. A paper tail ripper as defined in claim 19, wherein said knives are mounted in closely spaced planes.

* * * * *